(12) United States Patent
Venkataraman et al.

(10) Patent No.: US 12,375,423 B2
(45) Date of Patent: Jul. 29, 2025

(54) TECHNOLOGIES FOR PACKET FILTERING FOR PROTOCOL DATA UNIT SESSIONS

(71) Applicant: Apple Inc., Cupertino, CA (US)

(72) Inventors: Vijay Venkataraman, San Jose, CA (US); Xiangpeng Jing, Palo Alto, CA (US); Krisztian Kiss, Hayward, CA (US); Sree Ram Kodali, San Jose, CA (US); Martin Kugler, Poing (DE); Srinivasan Nimmala, San Jose, CA (US); Sridhar Prakasam, Woodside, CA (US); Kavya B. Ravikumar, San Diego, CA (US); Ahmed M. Salem, Ottobrunn (DE); Murtaza A. Shikari, Mountain View, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 18/402,600

(22) Filed: Jan. 2, 2024

(65) Prior Publication Data

US 2024/0146666 A1 May 2, 2024

Related U.S. Application Data

(62) Division of application No. 17/829,704, filed on Jun. 1, 2022, now Pat. No. 11,895,038, which is a division of application No. 17/206,661, filed on Mar. 19, 2021, now Pat. No. 11,394,658.

(60) Provisional application No. 63/007,224, filed on Apr. 8, 2020.

(51) Int. Cl.
| | |
|---|---|
| *H04L 47/80* | (2022.01) |
| *H04L 41/0866* | (2022.01) |
| *H04L 43/028* | (2022.01) |
| *H04L 43/16* | (2022.01) |
| *H04L 47/74* | (2022.01) |
| *H04L 47/762* | (2022.01) |
| *H04L 69/08* | (2022.01) |

(52) U.S. Cl.
CPC ........ *H04L 47/805* (2013.01); *H04L 41/0866* (2013.01); *H04L 43/028* (2013.01); *H04L 43/16* (2013.01); *H04L 47/745* (2013.01); *H04L 47/762* (2013.01); *H04L 69/08* (2013.01)

(58) Field of Classification Search
CPC .... H04L 47/745; H04L 47/762; H04L 47/805
See application file for complete search history.

(56) References Cited

U.S. PATENT DOCUMENTS

| | | | |
|---|---|---|---|
| 7,386,604 | B1 | 6/2008 | Aoun et al. |
| 11,394,658 | B2 | 7/2022 | Venkataraman et al. |
| 11,895,038 | B2 | 2/2024 | Venkataraman et al. |
| 2018/0132129 | A1 | 5/2018 | Sitomaniemi et al. |
| 2018/0376446 | A1 | 12/2018 | Youn et al. |
| 2019/0159059 | A1 | 5/2019 | Jheng et al. |

(Continued)

OTHER PUBLICATIONS

3GPP TS 24.501 V16.4.1, 3rd Generation Partnership Project; Technical Specification Group Core Network and Terminals; Non-Access-Stratum (NAS) protocol for 5G System (5GS); Stage 3, Mar. 2020, 666 pages. (Year: 2020).*

*Primary Examiner* — Hieu T Hoang
(74) *Attorney, Agent, or Firm* — Kilpatrick Townsend & Stockton LLP

(57) ABSTRACT

The present application relates to devices and components including apparatus, systems, and methods for user equipments and network components performing or assisting in packet filtering operations.

18 Claims, 10 Drawing Sheets

(56) References Cited

U.S. PATENT DOCUMENTS

| | | |
|---|---|---|
| 2019/0239113 A1 | 8/2019 | Wei et al. |
| 2019/0261260 A1 | 8/2019 | Dao et al. |
| 2020/0145884 A1* | 5/2020 | Guo .................. H04M 15/64 |
| 2020/0162958 A1 | 5/2020 | Huang-Fu et al. |
| 2020/0170003 A1* | 5/2020 | Kim .................. H04L 5/0053 |
| 2020/0275305 A1 | 8/2020 | Huang-Fu et al. |
| 2020/0322834 A1 | 10/2020 | Huang-Fu et al. |
| 2020/0344647 A1 | 10/2020 | Zhu et al. |
| 2021/0058827 A1 | 2/2021 | Holmström et al. |
| 2021/0250788 A1 | 8/2021 | Kim et al. |
| 2021/0297904 A1 | 9/2021 | Watfa |
| 2021/0320883 A1 | 10/2021 | Venkataraman et al. |
| 2022/0240213 A1 | 7/2022 | Ly et al. |
| 2022/0394459 A1 | 12/2022 | Jin et al. |
| 2023/0042442 A1* | 2/2023 | Kim .................. H04L 63/0876 |

* cited by examiner

| Filter Rule # | Attribute | Size [B] | IPv4/6 Filter Type | IPv4 Filter Types | | IPv6 Filter Types | |
|---|---|---|---|---|---|---|---|
| | | | 0 | 1 | 2 | 3 | 4 |
| | | | IPv4/6 Full Range | IPv4 Single & IPSec | IPv4 Range | IPv6 Prefix and IPSec | IPv6 Prefix Range |
| 0 | IPv4 Remote Address(4) + Subnet Mask(4) | 8 | | x | x | | |
| 1 | IPv4 Local Address(4) + Subnet Mask(4) | 8 | | x | x | | |
| 2 | IPv6 Remote Address(16) + Prefix(1) | 17 | | | | x | x |
| 3 | IPv6 Local Address(16) + Prefix(1) | 17 | | | | x | x |
| 4 | Protocol (IPv4)/Next Header (IPv6) | 1 | x | x | x | x | x |
| 5 | Single Local Port Number | 2 | | | | | |
| 6 | Local Port Number Range | 4 | | | x | | x |
| 7 | Single Remote Port Number | 2 | | | | | |
| 8 | Remote Port Number Range | 4 | | | | | |
| 9 | Security Parameter Index (parts of ESP/AH Headers) | 4 | x | x | x | x | x |
| 10 | Type of Service (IPv4)/Traffic Class (IPv6)(1) + Mask(1) | 2 | x | x | x | x | x |
| 11 | Flow Label (IPv6) | 3 | x | | | x | x |
| | SUM[B] | | 10 | 23 | 27 | 44 | 48 |

FIG. 3

| Bit | Filter Attribute |
|---|---|
| 0 | IPv4 Remote Address(4) + Subnet Mask(4) |
| 1 | IPv4 Local Address(4) + Subnet Mask(4) |
| 2 | IPv6 Remote Address(16) + Prefix(1) |
| 3 | IPv6 Local Address(16) + Prefix(1) |
| 4 | Protocol (IPv4)/Next Header (IPv6) |
| 5 | Single Local Port Number |
| 6 | Local Port Number Range |
| 7 | Single Remote Port Number |
| 8 | Remote Port Number Range |
| 9 | Security Parameter Index (Parte of ESP/AH Headers) |
| 10 | Type of Service (IPv4)/Traffic Class (IPv6) (1) + Mask(1) |
| 11 | Flow Label (IPv6) |

FIG. 4

| Precedence | Traffic Descriptor | Route Selector Component | Route Validation Criteria |
|---|---|---|---|
| 3 | FQDN=apple.com | Slice = S-NSAII-a; DNN = AppleNet -> PDU Session ID 1 | |
| 4 | App ID: OS1 | Slice = S-NSAII-b; DNN = Gaming -> PDU Session ID 2 | |
| 5 | Match All | Slice = S-NSAII-c; DNN = Internet -> PDU Session ID 1 | |
| 1 | apple.com/de/icloud | Slice = S-NSAII-D; DNN = iCloud, SSC Mode 1 -> PDU Session ID 4 | Time Window: 12AM-5AM |
| 2 | Destination IP address/port number | Slice = S-NSAII-B; DNN = AppleCloudDE -> PDU Session ID 5 | Specific to a Location (identified by TAI/Cell ID) |

FIG. 6

TECHNOLOGIES FOR PACKET FILTERING FOR PROTOCOL DATA UNIT SESSIONS

CROSS-REFERENCES TO RELATED APPLICATIONS

This application is a divisional application of U.S. patent application Ser. No. 17/829,704, filed Jun. 1, 2022, entitled "COORDINATED INTERNET PROTOCOL PACKET FILTERING," which is a divisional application of U.S. patent application Ser. No. 17/206,661, filed Mar. 19, 2021, entitled "COORDINATED INTERNET PROTOCOL PACKET FILTERING," which claims the benefit of U.S. Provisional Patent Application No. 63/007,224, filed Apr. 8, 2020, entitled "COORDINATED IP PACKET FILTERING." The disclosures of these applications are hereby incorporated by reference in their entireties.

BACKGROUND

The present disclosure generally relates to the field of electronic communication, including aspects generally related to coordinated Internet Protocol (IP) packet filtering in communication networks.

BRIEF DESCRIPTION OF THE DRAWINGS

The detailed description is provided with reference to the accompanying figures. The use of the same reference numbers in different figures indicates similar or identical items.

FIG. 3 is a diagram illustrating packet filter rules to implement coordinated IP packet filtering in accordance with various examples discussed herein.

FIG. 4 is a diagram illustrating packet filter rules to implement coordinated IP packet in accordance with various examples discussed herein.

FIG. 6 is a diagram illustrating route selection rules to implement coordinated IP packet filtering in accordance with various examples discussed herein.

Figure 1A:
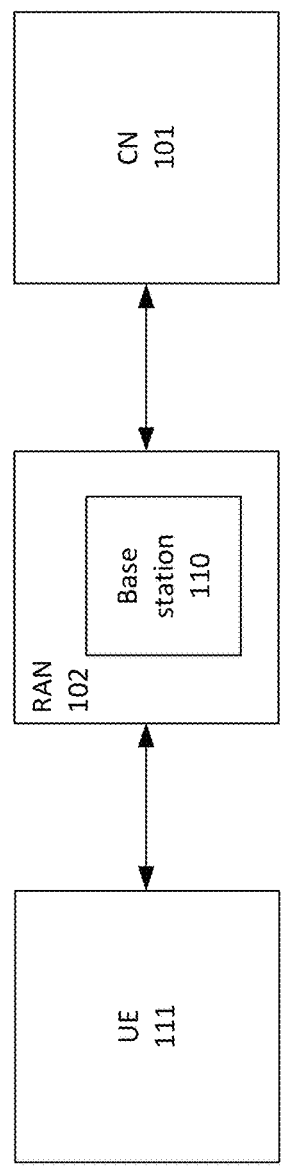
FIG. 1A is a schematic, block diagram illustration of components that may be used to implement coordinated IP packet filtering in communication networks in accordance with various examples discussed herein.

It will be appreciated that for simplicity and/or clarity of illustration, elements illustrated in the figures have not necessarily been drawn to scale. For example, the dimensions of some of the elements may be exaggerated relative to other elements for clarity. Further, if considered appropriate, reference numerals have been repeated among the figures to indicate corresponding and/or analogous elements.

DETAILED DESCRIPTION

In the following description, numerous specific details are set forth in order to provide a thorough understanding of various examples. However, various examples may be practiced without the specific details. In other instances, well-known methods, procedures, components, and circuits have not been described in detail so as not to obscure the particular examples. Further, various aspects of examples may be performed using various means, such as integrated semiconductor circuits ("hardware"), computer-readable instructions organized into one or more programs ("software"), or some combination of hardware and software. For the purposes of this disclosure reference to "logic" shall mean either hardware, software, or some combination thereof.

Reference throughout this specification to "one embodiment" or "an embodiment" means that a particular feature, structure or characteristic described in connection with the embodiment is included in at least one embodiment. Thus, appearances of the phrases "in one embodiment" or "in an embodiment" in various places throughout this specification are not necessarily all referring to the same embodiment. Furthermore, the particular features, structures or characteristics may be combined in any suitable manner in one or more embodiments. Additionally, the word "exemplary" is used herein to mean "serving as an example, instance, or illustration." Any embodiment described herein as "exemplary" is not to be construed as necessarily preferred or advantageous over other embodiments. For the purposes of the present document, the phrase "A or B" means (A), (B), or (A and B).

Various operations may be described as multiple discrete operations in turn and in a manner that is most helpful in understanding the claimed subject matter. The order of description, however, should not be construed as to imply that these operations are necessarily order dependent. In particular, these operations need not be performed in the order of presentation. Operations described may be performed in a different order than the described embodiment. Various additional operations may be performed and/or described operations may be omitted in additional embodiments.

Further details and techniques will be described with reference to the network architectures, devices, and methods described below with reference to FIGS. 1A-8.

FIG. 1A is a schematic, block diagram illustration of components in a network 100, which may be used to implement coordinated IP packet filtering in communication networks in accordance with various examples discussed herein. The network 100 may include a user equipment (UE) 111 coupled with a base station 110 of a radio access network (RAN) 102. The RAN 102 may be coupled with a core network (CN) 101. The CN 101 may be responsible for the overall control of the UEs (including UE 111) connected to the network and establishment of the bearers. The access network 102 may be responsible for radio-related functions. The UE 111 may also be referred to herein as a wireless device (WD) and/or a subscriber station (SS), and can include a machine-to-machine (M2M)-type device.

In various embodiments, the network 100 may include a Third Generation Partnership Project (3GPP) Long Term Evolution (LTE) RAN/CN; New Radio (NR) (or fifth generation (5G)) RAN/CN; or some combination.

In one exemplary configuration, a single cell of the RAN 102 provides one substantially localized geographical transmission point (having multiple antenna devices) that provides access to one or more UEs. In another exemplary configuration, a single cell of the RAN 102 provides multiple geographically substantially isolated transmission points (each having one or more antenna devices) with each transmission point providing access to one or more UEs simultaneously and with the signaling bits defined for the one cell so that all UEs share the same spatial signaling dimensioning. For normal user traffic (as opposed to broadcast), there may be no centralized controller in the access network 102; hence the access network 102 may be said to be flat.

Figure 1B:
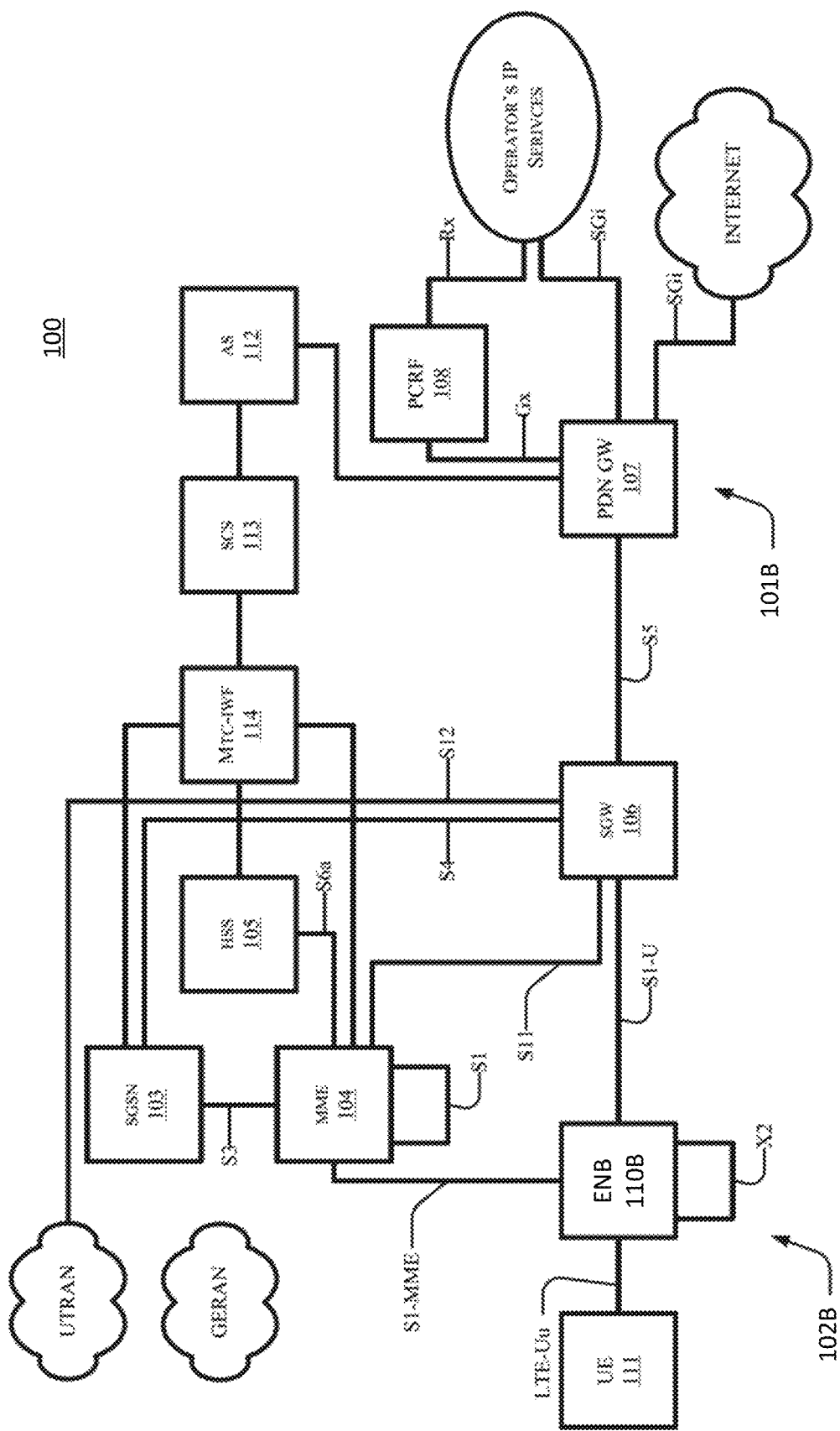
FIG. 1B is a schematic, block diagram illustration of additional components that may be used to implement coordinated IP packet filtering in communication networks in accordance with various examples discussed herein.

FIG. 1B illustrates an example of the network 100 in embodiments in which the network 100 includes LTE RAN/CN components. For example, the RAN may be an evolved universal radio access network (EUTRAN) 102B that is coupled with a CN that may be referred to as an Evolved Packet Core 101B. The main exemplary logical nodes of the EPC 101B include, but are not limited to, a Serving GPRS Support Node SGSN 103, the Mobility Management Entity (MME) 104, a Home Subscriber Server (HSS) 105, a Serving Gate (SGW) 106, a PDN Gateway 107, and a Policy and Charging Rules Function (PCRF) Manager 108. The functionality of each of the network elements of EPC 101B is well known and is not described herein. Each of the network elements of EPC 101B are interconnected by well-known exemplary standardized interfaces, some of which are indicated in FIG. 1B, such as interfaces S3, S4, and S5, although not described herein.

The EUTRAN 102B is formed by at least one base station that may be referred to as an evolved NodeB (eNB). In one example, UE 111 may be coupled to the eNB 110B by an LTE-Uu interface. The eNBs may be interconnected by an interface known as "X2" and may be connected to the EPC 101B by an S1 interface. More specifically, the eNB 110B may be connected to MME 104 by an S1 MME interface and to SGW 106 by an S1 U interface. The protocols that run between the eNBs and the UEs are generally referred to as the "AS protocols." Details of the various interfaces are well known and not described herein.

Figure 1C:
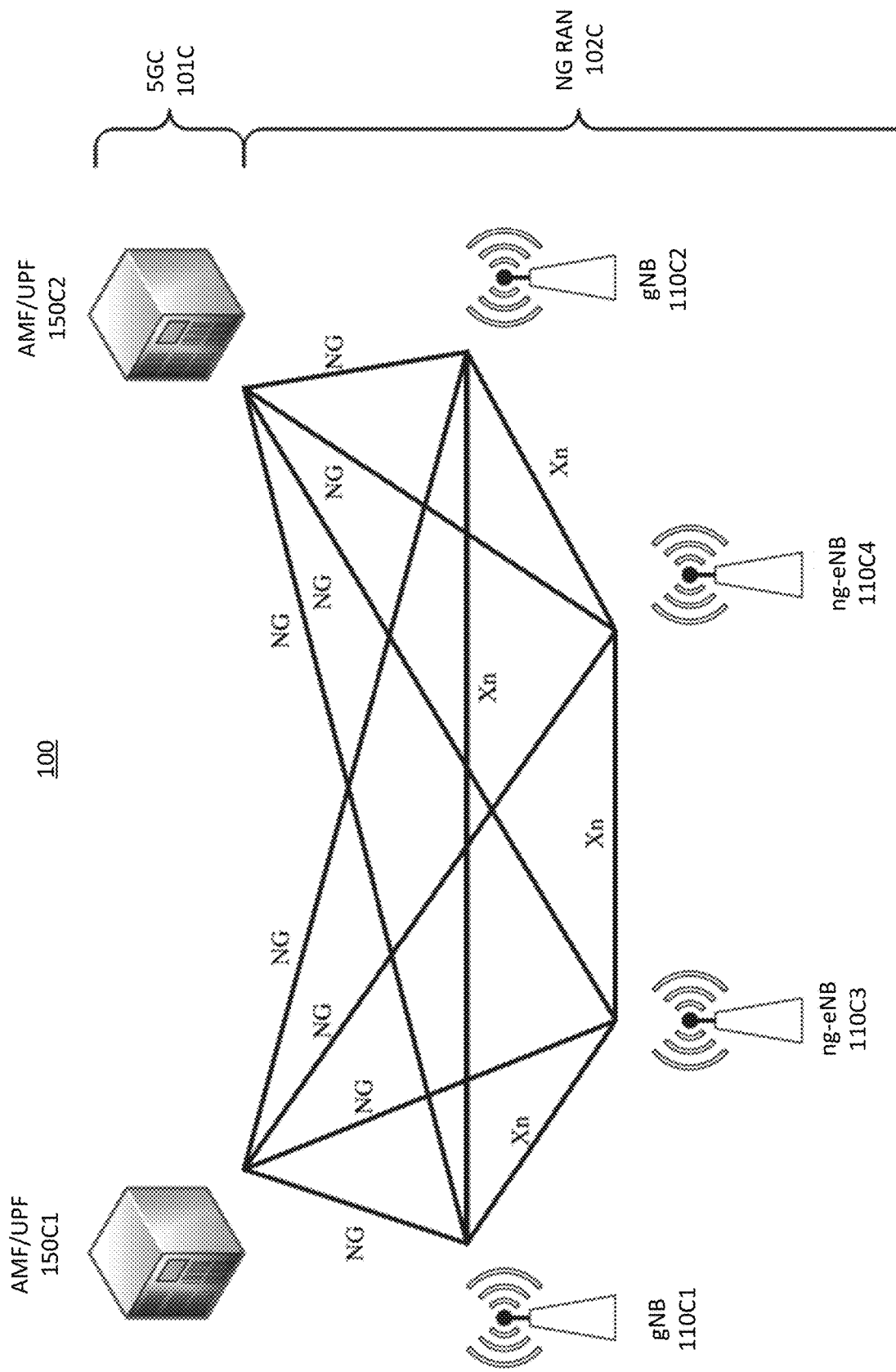
FIG. 1C is a schematic, block diagram illustration of additional components that may be used to implement coordinated IP packet filtering in communication networks in accordance with various examples discussed herein.

FIG. 1C illustrates an example of the network 100 in embodiments in which the network 100 includes 5G CN and an NR RAN. In particular, the CN may be a 5G core network (5GC) 101C and the RAN may be a next generation RAN (NG RAN) 102C. The 5GC 101C may include one or more Access and Mobility Management Function/User Plane Function (AMF/UPF) devices 150C1 and 150C2; and the NG RAN 102C may include one or more base stations such as, for example, next generation node Bs (gNBs) 110C1 and 110C2 and one or more next generation eNBs (ng-eNBs) 110C3 and 110C4. The AMF/UFP devices 150C may be communicatively coupled to the base stations via NG interfaces. The base stations may be communicatively coupled to one another via Xn interfaces.

Referring again to FIG. 1A, the base station 110 hosts the Physical (PHY), Medium Access Control (MAC), Radio Link Control (RLC), and Packet Data Control Protocol (PDCP) layers, which include the functionality of user-plane header-compression and encryption. The base station 110 also provides Radio Resource Control (RRC) functionality corresponding to the control plane, and performs many functions including radio resource management, admission control, scheduling, enforcement of negotiated uplink (UL) quality of service (QoS), cell information broadcast, ciphering/deciphering of user and control plane data, and compression/decompression of downlink (DL)/UL user plane packet headers.

The RRC layer in the base station 110 may cover functions related to the radio bearers, such as radio bearer control, radio admission control, radio mobility control, scheduling and dynamic allocation of resources to UEs in both uplink and downlink, header compression for efficient use of the radio interface, security of all data sent over the radio interface. The RRC layer may: make handover decisions based on neighbor cell measurements sent by the UE 111; generate pages for the UE 111 over-the-air; broadcast system information; control UE measurement reporting, such as the periodicity of Channel Quality Information (CQI) reports; and allocate cell-level temporary identifiers to active UEs 111. The RRC layer may also execute transfer of UE context from a source base station to a target base station during handover and provide integrity protection for RRC messages. Additionally, the RRC layer may be responsible for the setting up and maintenance of radio bearers.

In some examples, communication over a network such as network 100 may be digitized and assigned to discrete frames, each of which may contain subframes. Each subframe of the frame, in turn, may contain multiple slots. In some examples, the base station 110 may schedule uplink and downlink transmissions over a variety of frequency bands. The allocation of resources in subframes used in one frequency band may differ from those in another frequency band. Each slot of the subframe may contain a predetermined number symbols, depending on the system used. In some embodiments, the subframe may contain 12 or 24 subcarriers.

A resource grid may be used for downlink and uplink transmissions between the base station 110 and the UE 111. The resource grid may be a time-frequency grid, which is the physical resource in each slot. The smallest time-frequency unit in a resource grid may be denoted as a resource element (RE).

Each column and each row of the resource grid may correspond to one orthogonal frequency division multiplexing (OFDM) symbol and one subcarrier, respectively. The resource grid may contain resource blocks (RBs) that describe the mapping of physical channels to resource elements and physical RBs (PRBs). In some networking protocols, a PRB may be the smallest unit of resources that can be allocated to a UE. In some examples, a resource block may be 180 kHz wide in frequency and 1 slot long in time. In frequency, resource blocks may be either 12×15 kilohertz (kHz) subcarriers or 12×30 kHz subcarriers wide. For some channels and signals, 12 subcarriers may be used per resource block, depending on the system bandwidth. In some examples, the duration of a resource grid in the time domain may correspond to one subframe or two resource blocks. For example, each resource grid may comprise 12 (subcarriers)*14 (symbols)=168 resource elements for normal cyclic prefix (CP) case. Several different physical channels may be conveyed using such resource blocks. In a 5G network, the sizes of the resource blocks, resource elements, and symbols, among others, may vary.

There may be several different physical downlink channels that are conveyed using such resource blocks, including the physical downlink control channel (PDCCH) and the physical downlink shared channel (PDSCH). Each subframe may contain a PDCCH and the PDSCH. In some systems, the PDCCH may occupy up to the first three symbols (four in the case of narrow bandwidths of 1.4 MHz) of each subframe and carry, among other things, information about the transport format and resource allocations related to the PDSCH channel and uplink scheduling grants for a physical uplink shared channel (PUSCH) transmission.

The PDSCH may carry user data and higher layer signaling to a particular UE and occupy the remainder of the downlink subframe to avoid the resources in which downlink control channels (PDCCH) are transmitted. Typically, downlink scheduling (assigning control and shared channel resource blocks to UEs within a cell) may be performed at the base station based on channel quality information provided by the UEs, and then the downlink resource assignment information may be sent to a scheduled UE on the PDCCH used for (assigned to) PDSCH reception of the UE.

The PDCCH may contain downlink control information (DCI) in one of a number of formats that tell the UE where to find and how to decode the data, transmitted on PDSCH in the same subframe, from the resource grid. The DCI may provide details such as the number of resource blocks, resource allocation type, modulation scheme, transport block, redundancy version, or coding rate. Each DCI format may have a cyclic redundancy code (CRC) and be scrambled with a Radio Network Temporary Identifier (RNTI) that identifies the target UE for which the PDSCH is intended. Use of the RNTI, which may be UE-specific, may limit decoding of the DCI information (and hence the corresponding PDSCH) to only the intended UE.

The PDCCH may be located in any of a number of frequency/temporal regions, depending on whether the PDCCH is UE-specific or common, as well as the aggregation level. The set of possible candidate locations for the PDCCH is defined in terms of search spaces. A search space is defined by a set of Control Channel Element (CCE) candidates with a number of aggregation level $L \in \{1,2,4,8\}$ where the UE may monitor to find its PDCCHs. A common search space may carry DCIs that are common for all UEs; for example, system information (using the SI-RNTI), paging (P-RNTI), PRACH responses (RA-RNTI), or UL TPC commands (TPC-PUCCH/PUSCH-RNTI).

A UE-specific search space may carry DCIs for UE-specific allocations using a Cell Radio-Network Temporary Identifier (C-RNTI) assigned to the UE, a semi-persistent scheduling (SPS C-RNTI), or an initial allocation (temporary C-RNTI). When configuring an SPS (either uplink or downlink), the SPS C-RNTI is provided by the eNB and the UE is configured by higher layers to decode a PDCCH with a CRC scrambled by the SPS C-RNTI. The UE may monitor the PDCCH having a CRC scrambled by the SPS C-RNTI in every subframe as the eNB can activate/re-activate/release the SPS at any time using a DCI format with a CRC scrambled by an SPS C-RNTI. The received DCI format with a CRC scrambled by the SPS C-RNTI can be a grant/assignment for a retransmission or for activation/re-activation/release of the SPS.

In addition to the PDCCH, an enhanced PDCCH (EPDCCH) may be used by the base station 110 and the UE 111. The PDSCH may include data in some of the RBs and the EPDCCH may include downlink control signals in others RBs of the bandwidth supported by the UE 111. Different UEs may have different EPDCCH configurations. The sets of RBs corresponding to EPDCCH may be configured, for example, by higher layer signaling such as Radio Resource Control (RRC) signaling for EPDCCH monitoring.

The Physical Uplink Control Channel (PUCCH) may be used by the UE 111 to send Uplink Control Information (UCI) to the base station 110. The PUCCH may be mapped to an UL control channel resource defined by an orthogonal cover code and two RBs, consecutive in time, with hopping potentially at the boundary between adjacent slots. The PUCCH may take several different formats, with the UCI containing information dependent on the format. Specifically, the PUCCH may contain a scheduling request (SR), acknowledgement responses/retransmission requests (ACK/NACK) or a Channel Quality Indication (CQI)/Channel State Information (CSI). The CQI/CSI may indicate to the base station 110 an estimate of the current downlink channel conditions as seen by the UE to aid channel-dependent scheduling and, if one multiple-input, multiple-output (MIMO) transmission mode is configured to the UE, may include MIMO-related feedback (e.g. precoder matrix indication (PMI)).

Figure 2:
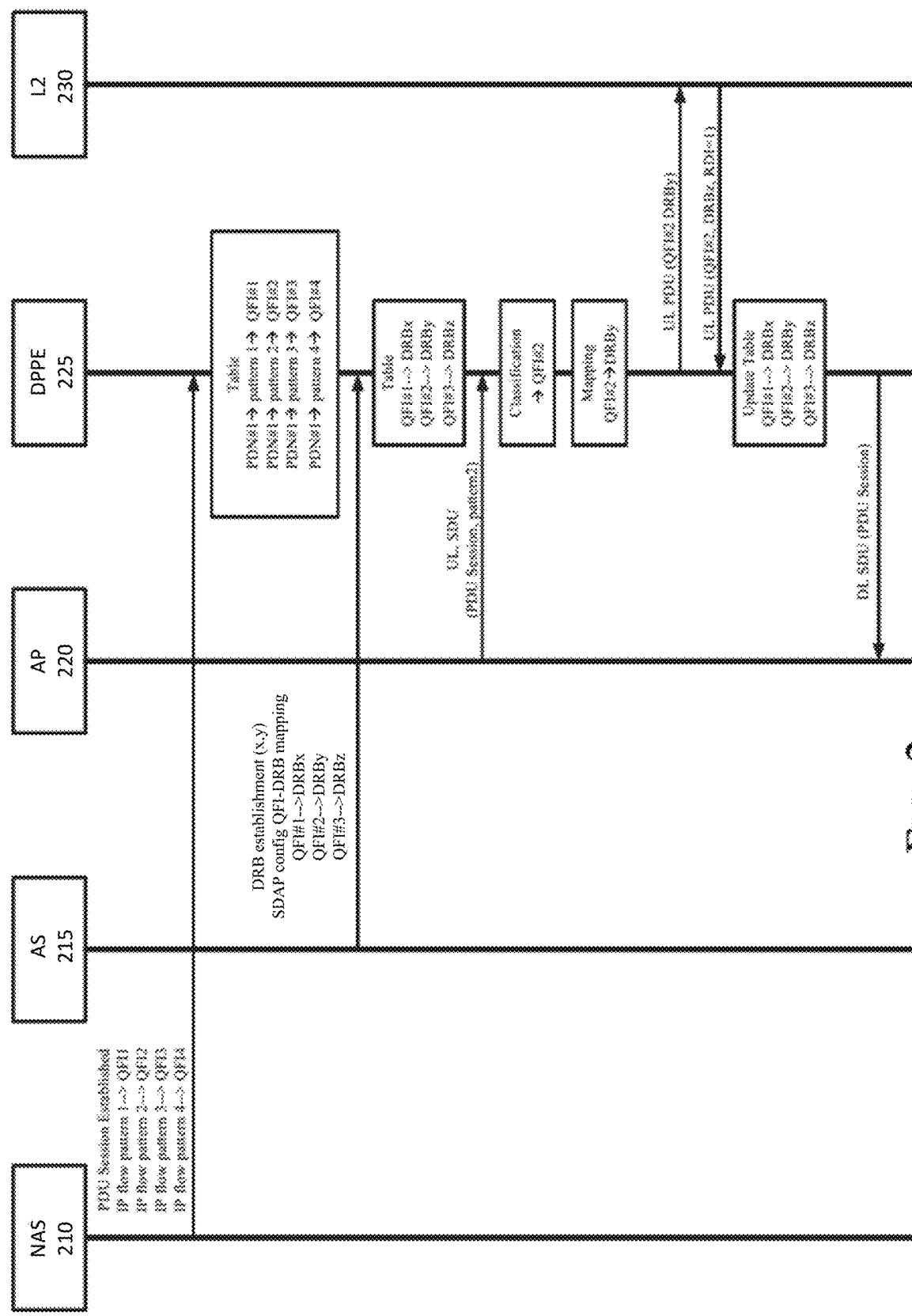
FIG. 2 is a diagram illustrating operations to implement coordinated IP packet filtering in a communication network in accordance with various examples discussed herein.

FIG. 2 is a diagram illustrating operations in a method to implement coordinated IP packet filtering in a communication network in accordance with various examples discussed herein. The diagram of FIG. 2 illustrates signaling and operations among various network entities including, for example, a NAS 210, an AS 215, an application processor (AP) 220, a data path processing engine (DPPE) 225, and an L2 entity 230. FIG. 3 is a diagram illustrating packet filter rules to implement coordinated IP packet filtering in accordance with various examples discussed herein. Referring to FIG. 2 and FIG. 3, in some examples IP flows may be classified into a Quality of Service (QoS) Flow Identifier (QFI) per protocol data unit (PDU) session. The QFI essentially defines the QoS handling for the flow, e.g., SQoS Indicator (5QI) or Guaranteed Flow Bit Rate (GFBR). Multiple IP flows may map to a single QFI. At any time, one service data flow (SDF) may be mapped to one and only one QFI.

In some examples, SDF-to-QFI mapping may be configured in the non-access stratum (NAS) 5G session management (SGSM) signaling. Alternatively, the SDF-to-QFI mapping may be implicitly updated by network via in-band service data adaptation protocol (SDAP) header modification in the download (DL) direction by setting reflective QoS Indicator (RQI) bit to 1.

The QFIs may then be mapped to a data radio bearer (DRB). Multiple QFIs may get mapped to a single DRB. At any time one QFI may be mapped to one and only one DRB. QFI-to-DRB mapping may get updated either out of band, for example by an RRCReconfiguration, or inband, for example by SDAP Reflective QoS by setting a reflective QOS-to-DRB mapping indication (RDI) bit to 1. If no rule is applied, then a default DRB for a PDU session may be used.

The following parameters may be defined for 3GPP networks: (1) the maximum number of PDU Sessions per subscriber identity module (SIM) at 15; (2) the maximum number of packet filters allowed to be configured per QFI at 16; and (3) the maximum number of QFIs allowed to be configured per PDU Session at 64.

Thus, in some embodiments, the maximum number of packet filters possible per PDU session=(16*64)=1024, and the maximum number of packet filters across all PDU sessions=1024*15=15360. Analogously, in some embodiments, the minimum number of packet filters the network expects a UE to support (per PDU session)=16, and a maximum number of packet filters expected to be supported by UE (per PDU session)=1024.

In some circumstances, this may create a number of challenges. Packet filter implementations are typically done in hardware due to heavy processing requirements. As an example, with UL throughput of ~6 Gbps, considering a mix of TCP ACK+TCP data packets, one new IP packet may be expected every 0.9946 microseconds. Thus, hardware may be under heavy resource constraints to run packet filters to accurately classify the packet within the deadline. Packet filtering may involve the UE looking into multiple headers (e.g., IP/TCP/ESP/AH) to make final decision about matching filters. Incorrect packet filtering may lead to critical packets classified over wrong QFI (e.g., ultra-reliable low-latency communication (URLLC) packets may go over default internet PDU session). Due to network slicing, URLLC and other 5G features, simultaneous traffic from multiple PDU sessions expected on UL/DL may lead to a higher packet filtering load. Additionally, memory constraints on a device may be strained to store such a large number of filters.

Described herein are multiple different techniques to address these and other issues. FIG. 4 is a diagram illustrating packet filter rules to implement coordinated IP packet in accordance with various examples discussed herein. Referring to FIG. 4, in some examples of a first technique, a UE may indicate to the network in a REGISTRATION REQUEST the maximum packet filter rules it supports in total, across all PDU sessions at baseband. This information may be taken into account by a session management function (SMF) and/or policy control function (PCF) while setting up QoS rules when establishing a new PDU session. In addition, a UE may also continue to indicate the maximum packet filter rules per PDU session.

In some examples, to adhere to and respect a UE's maximum packet filter support, the network may de-prioritize the packet filter rules in order of precedence, for example, lowest precedence rules may be deleted. Furthermore, when new PDU sessions are being created, to adhere to the maximum UE packet filter support, the network may delete certain packet filter rules on other PDU sessions. In some examples, the network may prioritize deleting packet filters that are associated with non-GBR (guaranteed bit rate) QFIs, for example, the network may attempt to continue to configure packet filter rules that are associated with GBR QFIs.

In some examples, a UE may also indicate to the network, as part of REGISTRATION REQUEST, PDU SESSION ESTABLISHMENT REQUEST, or PDU SESSION MODIFICATION REQUEST, the UE's support for each individual filter attributes for a packet filter (e.g., 0 to 11 in the table depicted in FIG. 4). In some examples, the rules depicted in FIG. 4 may be implemented in a new IE "Supported filter attributes for QoS rules; as a 2-byte field, where each bit corresponds to a particular filter attribute. In some examples, the network is expected to prune the QoS filter rules, and only configure the filter rule that includes filter attributes supported by the UE. If a filter rule is configured, and the UE does not support a specific filter attribute in this rule, the UE may delete or ignore the rule. This optimization may help UE implementations skip performing complex packet filtering rules such as decoding the encapsulating security payload (ESP) and authentication header (AH) headers for security parameter index attribute.

Figure 5:
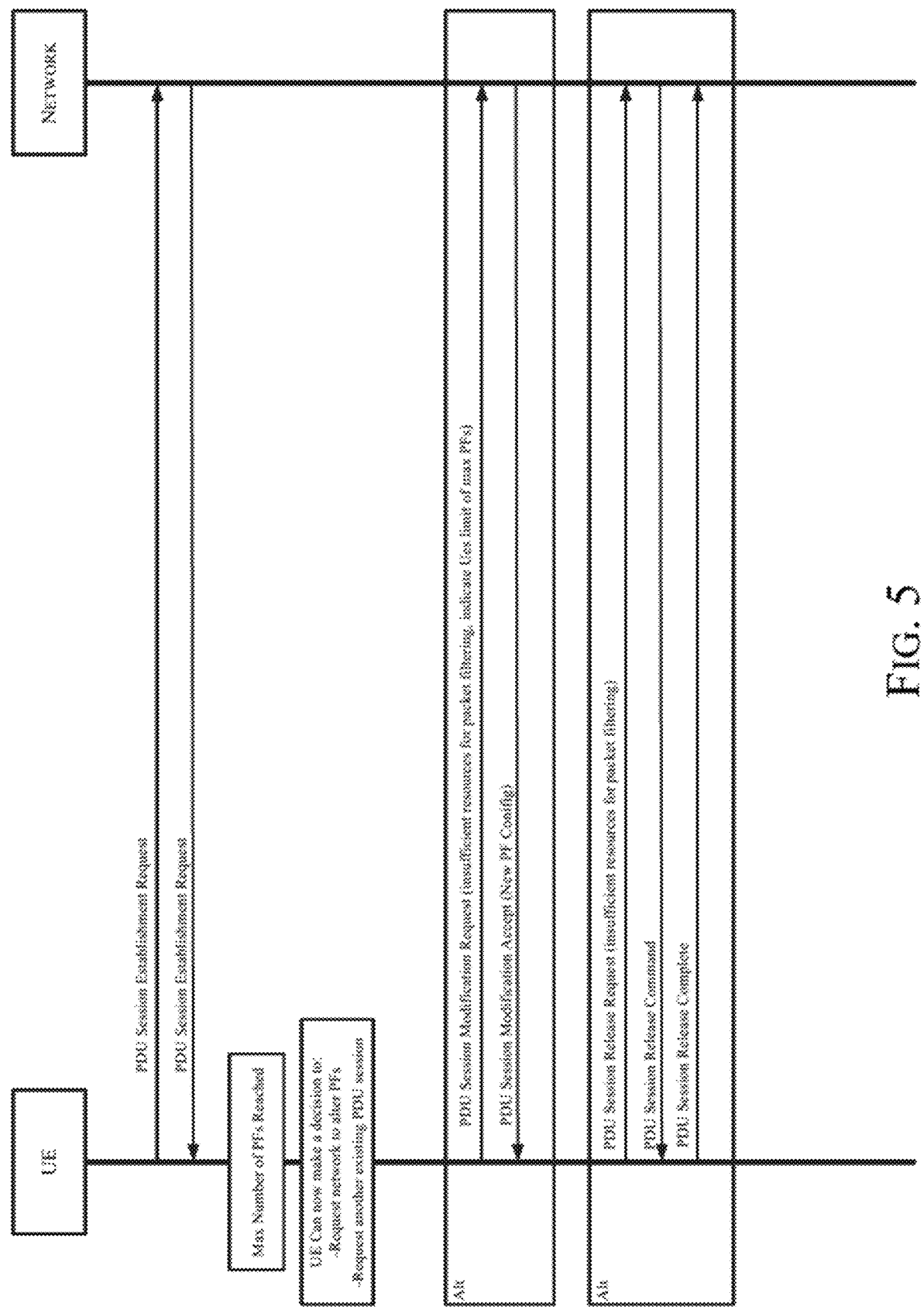
FIG. 5 is a diagram illustrating operations in a method to implement coordinated IP packet filtering in a communication system in accordance with various examples discussed herein.

FIG. 5 is a diagram illustrating operations in a method to implement coordinated IP packet filtering in a communication system in accordance with various examples discussed herein. Referring to FIG. 5, in another example, the UE may provide feedback when excessive filter rules are configured. In some examples, the UE hardware load may be dynamic, e.g., based on other activities ongoing in the system. Thus, it may be possible that at certain times of operations, the UE is able to handle a given number (n) filters, but when system load is high, the UE support reduces to a lower value. In such cases, when a network configures excessive QoS rules in a PDU session establishment accept, the UE may have the ability to indicate this feedback to the network. As illustrated in FIG. 5, a UE may at this point take a call for further action based on currently active sessions. For example, a UE may initiate a 'PDU SESSION MODIFICATION REQUEST,' as part of this message. The UE may indicate: (1) a SGSM cause value set to new cause, for example, insufficient resources available for packet filtering, (2) a maximum number of supported packet filters, for example, <lesser value than originally advertised>, (3) optionally, a UE may also include 'QoS rules' IE as part of the message to explicitly indicate to the network on which QoS rules it will continue processing. Alternatively, a UE may initiate a 'PDU SESSION RELEASE REQUEST' of different already configured PDU sessions that might be of a lower priority to UE.

In another example, a UE may be provided with processing capabilities to prioritize certain PDU sessions, and thus appropriately prioritize configuring packet filtering rules for prioritized PDU sessions before configuring packet filters for remaining PDU sessions. Criteria for choosing important PDU sessions may be based on type of network slice (for example, URLLC or vehicle to everything (V2X)), which may be determined based on single-network slice selection identifier (S-NSSAI). Traffic for these (or other) types of network slices may be considered critical and may rely on proper classification. Additional/alternative criteria for choosing important PDU sessions may be whether the PDU sessions serve voice or video applications. This type of traffic may be sensitive to delay and latency and may benefit from being classified to correct QFI/DRB.

Within a particular PDU session, a UE may apply prioritization based on: a precedence value of the QoS rule (e.g., existing behavior); a 5-tuple based filter rule; or a non 5-tuple based filter rule. However, it may happen that UE hardware takes excessive cycles to process complex rules such as looking into ESP/AH headers. In such cases, a UE may deprioritize examining packet filters that are configured to execute such rules. In some embodiments, a UE may consider prioritizing QoS rules that are associated with GBR QFIs.

In another example, as part of the PDU SESSION ESTABLISHMENT ACCEPT, the network may indicate a priority for the PDU session based at least in part on the network's guidance of which PDU session should be treated as higher priority/importance for this UE. This may be based on knowledge of the UE's subscription. For example, if a user has paid extra amounts to subscribe for a gaming slice/PDU session, the network may choose to indicate this PDU session is a high priority.

In another example, a UE may implement techniques to indicate accurate packet filter support on a per-PDU session basis. In one example, UE hardware may support a maximum of, for example, 1000 packet filters. Thus, based on existing 3GPP specifications, a UE may need to advertise per-PDU-session maximum packet filter support.

In one technique, a UE statically divides the maximum packet filter support equally among all supported PDU sessions. For example, if a UE supports a total of 8 PDU sessions, the UE will then indicate (1000/8)=125 packet filter support per PDU session. In another technique, a UE may implement adaptive reduction in packet filter support based on currently active PDU sessions. For example, when just one PDU session is active, a UE will indicate packet filter support for this PDU session=1000. When a second PDU session is established, the UE will indicate packet filter support=500 (for the new PDU session). For the already existing PDU session, UE may initiate a PDU session modification procedure to indicate support for just 500 packet filters.

In another technique, a UE may implement implicit adaptive reduction in the packet filter support. For example, based on the maximum packet filter support indicated using the previous technique, both the network and the UE may implicitly adjust the supported packet filter based on a number of active PDU sessions. In this technique, no explicit PDU SESSION MODIFICATION signaling may be needed.

In another technique, a UE may adapt to an appropriate value based on a past history of configuration of packet filters for a particular PDU session. For example, for a URLLC PDU session, the first time a UE is establishing a PDU session, the UE may indicate support for a maximum (for example, 1000) packet filters. Once the network configures the packet filters for this PDU session, the UE may save the number of packet filters that were actually configured (e.g., 320). The next time a UE needs to establish a URLLC PDU session (for example, after reboot), the UE may indicate support for 320 packet filters for this PDU session.

FIG. 6 is a diagram illustrating route selection rules to implement coordinated IP packet filtering in accordance with various examples discussed herein. Referring to FIG. 6, in some examples UE route selection policy (URSP) rules indicate to the UE how to route specific traffic to a specific PDU session. In some examples, traffic to a remote IP address and/or remote port number gets routed via PDU Session 1, traffic to *.icloud.com (Domain based routing) gets routed via PDU session 2; traffic originating from a vendor's app (appID based routing) gets routed via PDU session 3. At the end of this step, any IP flow should be routed via the right PDU session. At any time one IP flow may be mapped to one and only one PDU session.

As seen in FIG. 6, the traffic descriptors for URSP rules include: domain name based descriptors (for example, *.apple.com); App ID based traffic descriptors (for example, all traffic from app1 gets routed through S-NSSAI 1); and regular 5-tuple based traffic descriptors (for example, src/dest IP addr or src/dest port number).

UE modem implementations and/or upper layers may not have capability to execute or identify some of the complex traffic descriptors, for example, domain name based routing and/or application identifier-based routing, based on reception of IP packet from the host. This is because it is non-trivial to identify the domain name/app ID based on just the received IP packet from a host. Due to this, a UE may incorrectly route a user IP packet via the wrong PDU session, leading to unpredictable user experience. For example, a packet from a URLLC application may get routed via regular best effort internet PDU session. Additionally, currently the network may configure a maximum of 255 URSP rules. However, due to memory and processing constraints, a UE may not have the capability to handle and execute 255 URSP rules per IP packet. This might lead to significant performance issues with higher per packet processing time leading to lower throughput. Thus, it is desired to have some improvements in this area.

In another example, the UE may indicate the supported traffic descriptor identification for URSP rules in a NAS REGISTRATION REQUEST message. For example, a "Supported Traffic Descriptors for URSP" can be a 1-byte field, where each bit in the field indicates support for a particular traffic descriptor that may be configured in URSP. For example, a bit set to 0 value may indicate that the UE does not support this particular traffic descriptor identification, while a bit set to 1 value may indicate that the UE does support this particular traffic descriptor identification. The field may include: bit 0 to indicate support for domain based traffic descriptor; bit 1 to indicate support for appID based traffic descriptor; bit 2 to indicate support for connection capability based traffic descriptor; bit 3 to indicate support for IP based descriptors; bit 4 to indicate support for non-IP descriptor; and bits 5-8 may be reserved for future use.

In another example, the UE may indicate to the network the maximum limit of URSP policy rules it can handle in a REGISTRATION REQUEST. In this example, the PCF may take this into account and include only the highest precedence URSP rules for this device within the maximum limit.

Access traffic steering, switching, and splitting (ATSSS) policy includes a prioritized list of ATSSS rules. Each ATSSS rule includes a steering mode that is to be applied to traffic matching the rule. The ATSSS policy is sent to a UE for UL traffic steering and to user plane function (UPF) for DL traffic steering. Example rules include the following:

ATSSS Rule #1—Precedence 1
   Traffic Descriptor: Application 1 [OSId+OSAppId]
   Steering Mode: Active Standby; Active Access: 3GPP; Standby Access: Non-3GPP
ATSSS Rule #2—Precedence 2
   Traffic Descriptor: TCP flow to destination IP address 1.2.3.4
   Steering Mode: Load Balancing, 3GPP=20%, Non-3GPP=80%
   Steering Functionality: MPTCP
ATSSS Rule #3—Precedence 3
   Traffic Filter: UDP flow to destination Port 8080
   Steering Mode: Smallest Delay
ATSSS Rule #4—Priority Default
   Traffic Descriptor: All Traffic
   Steering Mode: Active Standby; Active Access: Non-3GPP; Standby Access: 3GPP.

In some examples, the UE may indicate the supported traffic descriptor identification for ATSSS rules in the NAS REGISTRATION REQUEST message. The "Supported Traffic Descriptors for ATSSS" may be implemented as a 1-byte field, where each bit indicates support for a particular traffic descriptor that may be configured in URSP. A bit set to 0 value may indicate that the UE does not support this particular traffic descriptor identification, while a bit set to 1 value may indicate that the UE does support this particular traffic descriptor identification. The field may include: bit 0 to indicate support for domain based traffic descriptor; bit 1 to indicate support for appID based traffic descriptor; bit 2 to indicate support for connection capability based traffic descriptor; bit 3 to indicate support for IP-based descriptors; bit 4 to indicate support for non-IP descriptor; and bits 5-8 may be reserved for future use.

In another example, the UE may indicate the maximum limit of ATSSS policy rules it can handle to the NW in the REGISTRATION REQUEST. In the example, the PCF may take this into account and include only the highest precedence ATSSS rules for this device within the maximum limit. Optionally, the UE may combine the feedback for "Supported Traffic Descriptors" for both ATSSS and URSP into a single indication to NW.

Figure 7:
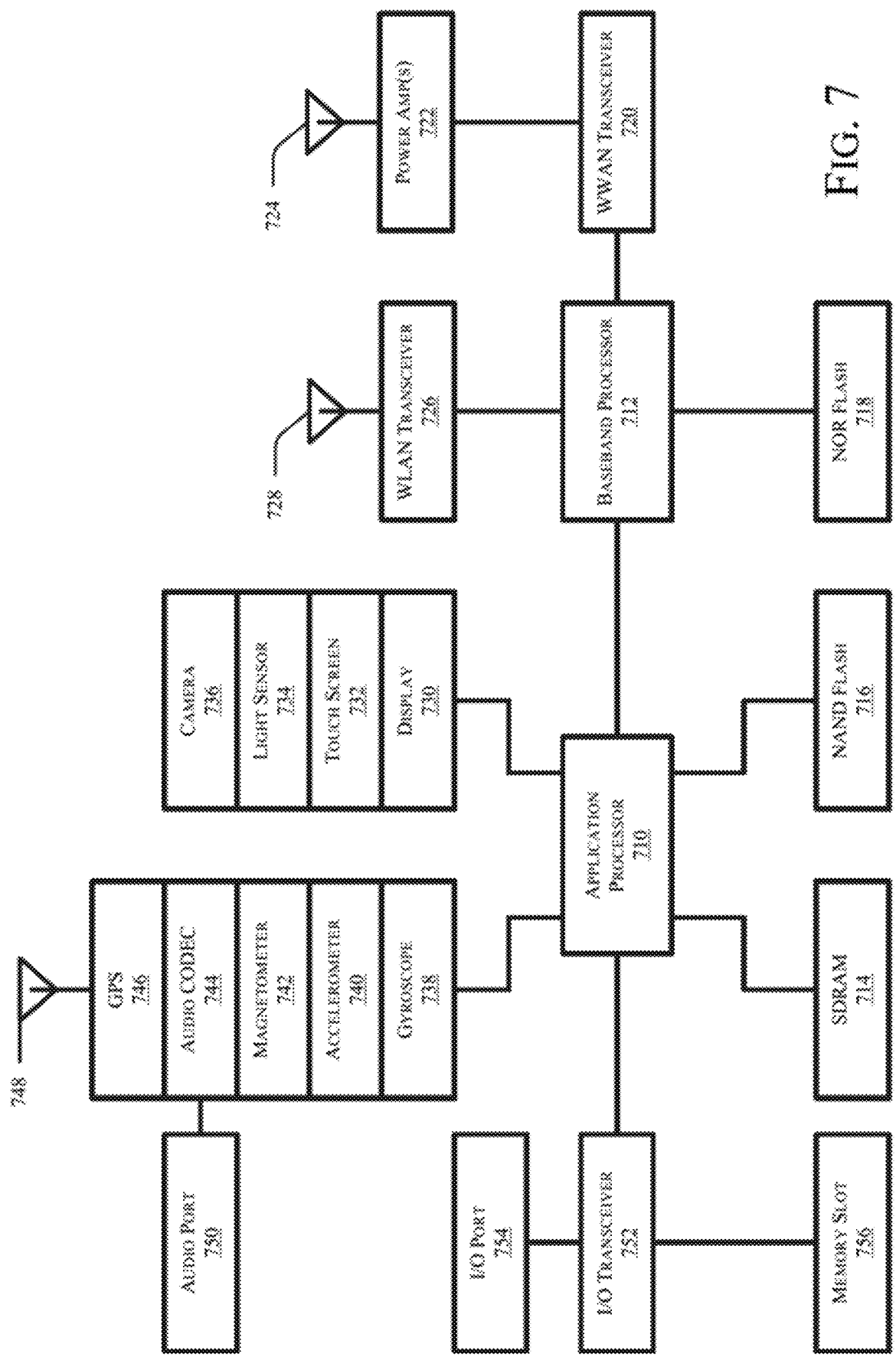
FIG. 7 is a schematic, block diagram illustration of an information handling system in accordance with exemplary embodiments disclosed herein.

FIG. 7 is a schematic, block diagram illustration of an information handling system in accordance with exemplary embodiments disclosed herein. Information handling system 700 of FIG. 7 may tangibly embody one or more of any of the exemplary devices, exemplary network elements and/or functional entities of the network as shown in and described herein. In one example, information-handling system 700 may represent base station 110 or UE 111, with greater or fewer components depending on the hardware specifications of the particular device or network element. In another example, information-handling system may provide M2M-type device capability. Although information-handling system 700 represents one example of several types of computing platforms, information-handling system 700 may include more or fewer elements and/or different arrangements of elements than shown in FIG. 7, and the scope of the claimed subject matter is not limited in these respects.

In one or more examples, information-handling system 700 may comprise application circuitry 710 and a baseband processor 712. Application circuitry 710, which may also be referred to as application processor 710, may be utilized as a general purpose processor to run applications and the various subsystems for information handling system 700, and to provide an uplink-transmit-power control technique that reduces interference experienced at other wireless devices according to the subject matter disclosed herein. Application circuitry 710 may include a single core or alternatively may include multiple processing cores wherein one or more of the cores may comprise a digital signal processor or digital signal processing core. Furthermore, application circuitry 710 may include a graphics processor or coprocessor disposed on the same chip, or alternatively a graphics processor coupled to application circuitry 710 may comprise a separate, discrete graphics chip. Application circuitry 710 may include on-board memory, such as cache memory, and further may be coupled to external memory devices such as synchronous dynamic random access memory (SDRAM) 714 for storing and/or executing applications. NAND flash 716 may be used for storing applications and/or data even when information handling system 700 is powered off.

In one example, baseband processor 712 may control the broadband radio functions for information-handling system 700. Baseband processor 712 may store code for controlling such broadband radio functions in a NOR flash 718. Baseband processor 712 controls a wireless wide area network (WWAN) transceiver 720 that may be used for modulating and/or demodulating broadband network signals, for example, for communicating via a 3GPP NR network as discussed herein with respect to FIG. 1. The WWAN transceiver 720 couples to one or more power amplifiers 722 that are respectively coupled to one or more antennas 724 for sending and receiving radio-frequency signals via the WWAN broadband network. The baseband processor 712 also may control a wireless local area network (WLAN) transceiver 726 coupled to one or more suitable antennas 728 that may be capable of communicating via a WLAN or other standard. It should be noted that these are merely exemplary implementations for application circuitry 710 and baseband processor 712, and the scope of the claimed subject matter is not limited in these respects. For example, any one or more of SDRAM 714, NAND flash 716 and/or NOR flash 718 may comprise other types of memory technology, such as magnetic-based memory, chalcogenide-based memory, phase-change-based memory, optical-based memory, or ovonic-based memory, and the scope of the claimed subject matter is not limited in this respect.

In one or more embodiments, application circuitry 710 may drive a display 730 for displaying various information or data, and may further receive touch input from a user via a touch screen 732, for example, via a finger or a stylus. In one exemplary embodiment, screen 732 displays a menu and/or options to a user that are selectable via a finger and/or a stylus for entering information into information-handling system 700.

An ambient light sensor 734 may be utilized to detect an amount of ambient light in which information-handling system 700 is operating, for example, to control a brightness or contrast value for display 730 as a function of the intensity of ambient light detected by ambient light sensor 734. One or more cameras 736 may be utilized to capture images that are processed by application circuitry 710 and/or at least temporarily stored in NAND flash 716. Furthermore, application circuitry may be coupled to a gyroscope 738, accelerometer 740, magnetometer 742, audio coder/decoder (CODEC) 744, and/or global positioning system (GPS) controller 746 coupled to an appropriate GPS antenna 748, for detection of various environmental properties including location, movement, and/or orientation of information-handling system 700. Alternatively, controller 746 may comprise a Global Navigation Satellite System (GNSS) controller. Audio CODEC 744 may be coupled to one or more audio ports 750 to provide microphone input and speaker outputs either via internal devices and/or via external devices coupled to the information-handling system 700 via the audio ports 750, for example, via a headphone and microphone jack. In addition, application circuitry 710 may couple to one or more input/output (I/O) transceivers 752 to couple to one or more I/O ports 754 such as a universal serial bus (USB) port, a high-definition multimedia interface (HDMI) port, or a serial port. Furthermore, one or more of the I/O transceivers 752 may couple to one or more memory slots 756 for optional removable memory, such as secure digital (SD) card or a subscriber identity module (SIM) card, although the scope of the claimed subject matter is not limited in these respects.

As used herein, the term "circuitry" may refer to, be part of, or include an Application Specific Integrated Circuit (ASIC), an electronic circuit, a processor (shared, dedicated, or group), and/or memory (shared, dedicated, or group) that execute one or more software or firmware programs, a combinational logic circuit, and/or other suitable hardware components that provide the described functionality. In some embodiments, the circuitry may be implemented in, or functions associated with the circuitry may be implemented by, one or more software or firmware modules. In some embodiments, circuitry may include logic, at least partially operable in hardware.

Figure 8:
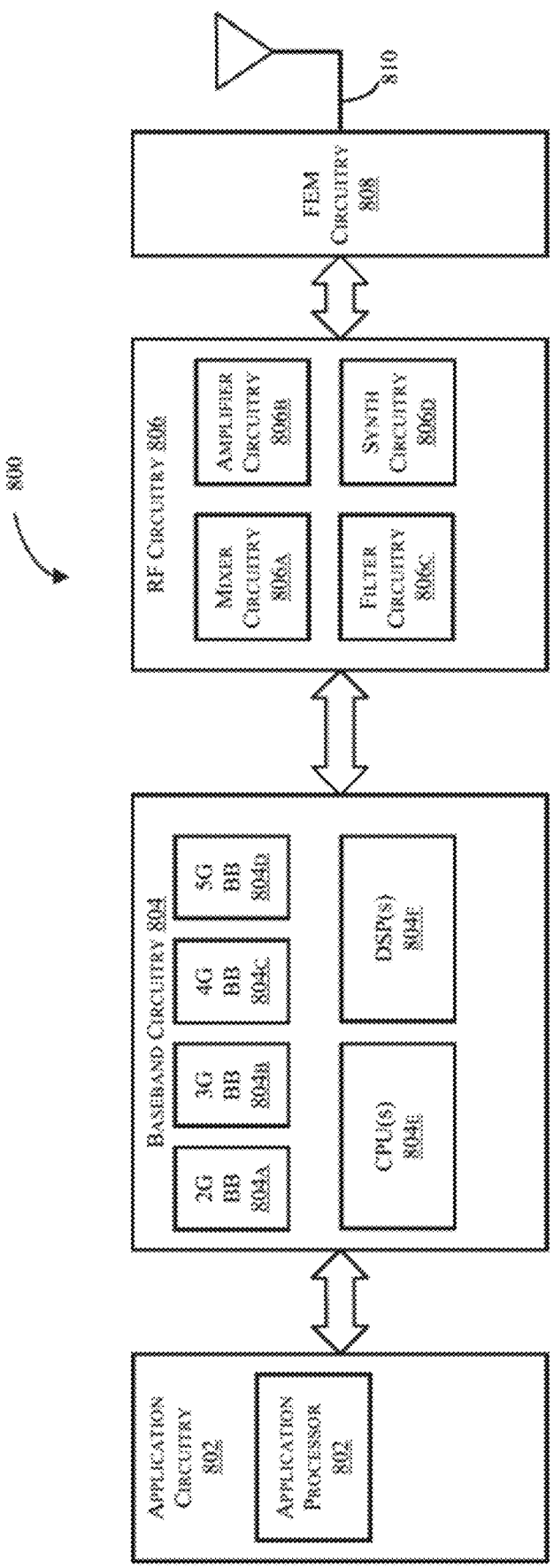
FIG. 8 is a schematic, block diagram illustration of components of a representative UE in accordance with one or more exemplary embodiments disclosed herein.

FIG. 8 is a schematic, block diagram illustration of components of a representative UE device in accordance with one or more exemplary embodiments disclosed herein. In some embodiments, the UE 800 may be similar to, and substantially interchangeable with, UE 111. The UE 800 may include application circuitry 802, baseband circuitry 804, Radio Frequency (RF) circuitry 806, front-end module (FEM) circuitry 808 and one or more antennas 810, coupled together at least as shown.

The application circuitry 802 may include application circuitry. For example, the application circuitry 802 may include circuitry such as, but not limited to, one or more single-core or multi-core processors. The processor(s) may include any combination of general-purpose processors and dedicated processors (e.g., graphics processors or application processors). The processors may be coupled with and/or may include memory/storage and may be configured to execute instructions stored in the memory/storage to enable various applications and/or operating systems to run on the system.

The baseband circuitry 804 may include circuitry such as, but not limited to, one or more single-core or multi-core processors. The baseband circuitry 804 may include one or more baseband processors and/or control logic to process baseband signals received from a receive signal path of the RF circuitry 806 and to generate baseband signals for a transmit signal path of the RF circuitry 806. Baseband processing circuitry 804 may interface with the application circuitry 802 for generation and processing of the baseband signals and for controlling operations of the RF circuitry 806. For example, in some embodiments, the baseband circuitry 804 may include a second generation (2G) baseband processor 804a, third generation (3G) baseband processor 804b, fourth generation (4G) baseband processor 804c, and/or a 5G baseband processor 804d. It will be appreciated that baseband circuitry 804 may comprise one or more additional baseband processors for other existing generations, generations in development or to be developed in the future (for example, 6G). The baseband circuitry 804 (for example, one or more of baseband processors 804a-d) may handle various radio control functions that enable communication with one or more radio networks via the RF circuitry 806. The radio control functions may include, but are not limited to, signal modulation/demodulation, encoding/decoding, radio frequency shifting, etc. In some embodiments, modulation/demodulation circuitry of the baseband circuitry 804 may include Fast-Fourier Transform (FFT), precoding, and/or constellation mapping/demapping functionality. In some embodiments, encoding/decoding circuitry of the baseband circuitry 804 may include convolution, tail-biting convolution, turbo, Viterbi, and/or Low Density Parity Check (LDPC) encoder/decoder functionality. Embodiments of modulation/demodulation and encoder/decoder functionality are not limited to these examples and may include other suitable functionality in other embodiments.

In some embodiments, the baseband circuitry 804 may include elements of a protocol stack such as, for example, elements of an EUTRAN/NR protocol including, for example, physical (PHY), media access control (MAC), radio link control (RLC), packet data convergence protocol (PDCP), and/or radio resource control (RRC) elements. A central processing unit (CPU) 804e of the baseband circuitry 804 may be configured to run elements of the protocol stack for signaling of the PHY, MAC, RLC, PDCP and/or RRC layers. In some embodiments, the baseband circuitry may include one or more audio digital signal processor(s) (DSP) 804f The audio DSP(s) 804f may include elements for compression/decompression and echo cancellation and may include other suitable processing elements in other embodiments. Components of the baseband circuitry may be suitably combined in a single chip, a single chipset, or disposed on a same circuit board in some embodiments. In some embodiments, some or all of the constituent components of the baseband circuitry 804 and the application circuitry 802 may be implemented together such as, for example, on a system on a chip (SOC).

In some embodiments, the baseband circuitry 804 may provide for communication compatible with one or more radio technologies. For example, in some embodiments, the baseband circuitry 804 may support communication with an EUTRAN/NR and/or other wireless metropolitan area networks (WMAN), a wireless local area network (WLAN), or a wireless personal area network (WPAN). Embodiments in which the baseband circuitry 804 is configured to support radio communications of more than one wireless protocol may be referred to as multi-mode baseband circuitry.

RF circuitry 806 may enable communication with wireless networks using modulated electromagnetic radiation through a non-solid medium. In various embodiments, the RF circuitry 806 may include switches, filters, or amplifiers to facilitate the communication with the wireless network. RF circuitry 806 may include a receive signal path which may include circuitry to down-convert RF signals received from the FEM circuitry 808 and provide baseband signals to the baseband circuitry 804. RF circuitry 806 may also include a transmit signal path which may include circuitry to up-convert baseband signals provided by the baseband circuitry 804 and provide RF output signals to the FEM circuitry 808 for transmission.

In some embodiments, the RF circuitry 806 may include a receive signal path and a transmit signal path. The receive signal path of the RF circuitry 806 may include mixer circuitry 806a, amplifier circuitry 806b and filter circuitry 806c. The transmit signal path of the RF circuitry 806 may include filter circuitry 806c and mixer circuitry 806a. RF circuitry 806 may also include synthesizer circuitry 806d for synthesizing a frequency for use by the mixer circuitry 806a of the receive signal path and the transmit signal path. In some embodiments, the mixer circuitry 806a of the receive signal path may be configured to down-convert RF signals received from the FEM circuitry 808 based on the synthesized frequency provided by synthesizer circuitry 806d. The amplifier circuitry 806b may be configured to amplify the down-converted signals and the filter circuitry 806c may be a low-pass filter (LPF) or band-pass filter (BPF) configured to remove unwanted signals from the down-converted signals to generate output baseband signals. Output baseband signals may be provided to the baseband circuitry 804 for further processing. In some embodiments, the output baseband signals may be zero-frequency baseband signals, although this is not a requirement. In some embodiments, mixer circuitry 806a of the receive signal path may comprise passive mixers, although the scope of the embodiments is not limited in this respect.

In some embodiments, the mixer circuitry 806a of the transmit signal path may be configured to up-convert input baseband signals based on the synthesized frequency provided by the synthesizer circuitry 806d to generate RF output signals for the FEM circuitry 808. The baseband signals may be provided by the baseband circuitry 804 and may be filtered by filter circuitry 806c. The filter circuitry 806c may include a low-pass filter (LPF), although the scope of the embodiments is not limited in this respect.

In some embodiments, the mixer circuitry 806a of the receive signal path and the mixer circuitry 806a of the transmit signal path may include two or more mixers and may be arranged for quadrature downconversion and/or upconversion respectively. In some embodiments, the mixer circuitry 806a of the receive signal path and the mixer circuitry 806a of the transmit signal path may include two or more mixers and may be arranged for image rejection (e.g., Hartley image rejection). In some embodiments, the mixer circuitry 806a of the receive signal path and the mixer circuitry 806a may be arranged for direct downconversion and/or direct upconversion, respectively. In some embodiments, the mixer circuitry 806a of the receive signal path and the mixer circuitry 806a of the transmit signal path may be configured for super-heterodyne operation.

In some embodiments, the output baseband signals and the input baseband signals may be analog baseband signals, although the scope of the embodiments is not limited in this respect. In some alternate embodiments, the output baseband signals and the input baseband signals may be digital baseband signals. In these alternate embodiments, the RF circuitry 806 may include analog-to-digital converter (ADC) and digital-to-analog converter (DAC) circuitry and the baseband circuitry 804 may include a digital baseband interface to communicate with the RF circuitry 806.

In some dual-mode embodiments, a separate radio IC circuitry may be provided for processing signals for each spectrum, although the scope of the embodiments is not limited in this respect.

In some embodiments, the synthesizer circuitry 806d may be a fractional-N synthesizer or a fractional N/N+1 synthesizer, although the scope of the embodiments is not limited in this respect as other types of frequency synthesizers may be suitable. For example, synthesizer circuitry 806d may be a delta-sigma synthesizer, a frequency multiplier, or a synthesizer comprising a phase-locked loop with a frequency divider.

The synthesizer circuitry 806d may be configured to synthesize an output frequency for use by the mixer circuitry 806a of the RF circuitry 806 based on a frequency input and a divider control input. In some embodiments, the synthesizer circuitry 806d may be a fractional N/N+1 synthesizer.

In some embodiments, frequency input may be provided by a voltage controlled oscillator (VCO), although that is not a requirement. Divider control input may be provided by either the baseband circuitry 804 or the application circuitry 802 depending on the desired output frequency. In some embodiments, a divider control input (e.g., N) may be determined from a look-up table based on a channel indicated by the application circuitry 802.

Synthesizer circuitry 806d of the RF circuitry 806 may include a divider, a delay-locked loop (DLL), a multiplexer and a phase accumulator. In some embodiments, the divider may be a dual modulus divider (DMD) and the phase accumulator may be a digital phase accumulator (DPA). In some embodiments, the DMD may be configured to divide the input signal by either N or N+1 (e.g., based on a carry out) to provide a fractional division ratio. In some example embodiments, the DLL may include a set of cascaded, tunable, delay elements, a phase detector, a charge pump and a D-type flip-flop. In these embodiments, the delay elements may be configured to break a VCO period up into Nd equal packets of phase, where Nd is the number of delay elements in the delay line. In this way, the DLL provides negative feedback to help ensure that the total delay through the delay line is one VCO cycle.

In some embodiments, synthesizer circuitry 806d may be configured to generate a carrier frequency as the output frequency, while in other embodiments, the output frequency may be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some embodiments, the output frequency may be a LO frequency (fLO). In some embodiments, the RF circuitry 806 may include an IQ/polar converter.

FEM circuitry 808 may include a receive signal path which may include circuitry configured to operate on RF signals received from one or more antennas 810, amplify the received signals and provide the amplified versions of the received signals to the RF circuitry 806 for further processing. FEM circuitry 808 may also include a transmit signal path which may include circuitry configured to amplify signals for transmission provided by the RF circuitry 806 for transmission by one or more of the one or more antennas 810.

In some embodiments, the FEM circuitry 808 may include a TX/RX switch to switch between transmit mode and receive mode operation. The FEM circuitry may include a receive signal path and a transmit signal path. The receive signal path of the FEM circuitry may include a low-noise amplifier (LNA) to amplify received RF signals and provide the amplified received RF signals as an output (e.g., to the RF circuitry 806). The transmit signal path of the FEM circuitry 808 may include a power amplifier (PA) to amplify input RF signals (e.g., provided by RF circuitry 806), and one or more filters to generate RF signals for subsequent transmission (e.g., by one or more of the one or more antennas 810).

In some embodiments, the UE device 800 may include additional elements such as memory/storage, display, camera, sensor, and/or input/output (I/O) interface.

In various examples, the operations discussed herein may be implemented as hardware (e.g., circuitry), software, firmware, microcode, or combinations thereof, which may be provided as a computer program product, e.g., including a tangible (e.g., non-transitory) machine-readable or computer-readable medium having stored thereon instructions (or software procedures) used to program a computer to perform a process discussed herein. Also, the term "logic" may include, by way of example, software, hardware, or combinations of software and hardware. The machine-readable medium may include a storage device such as those discussed herein.

Reference in the specification to "one example" or "an example" means that a particular feature, structure, or characteristic described in connection with the example may be included in at least an implementation. The appearances of the phrase "in one example" in various places in the specification may or may not be all referring to the same example.

Also, in the description and claims, the terms "coupled" and "connected," along with their derivatives, may be used. In some examples, "connected" may be used to indicate that two or more elements are in direct physical or electrical contact with each other. "Coupled" may mean that two or more elements are in direct physical or electrical contact. However, "coupled" may also mean that two or more elements may not be in direct contact with each other, but may still cooperate or interact with each other.

Thus, although examples have been described in language specific to structural features and/or methodological acts, it is to be understood that claimed subject matter may not be limited to the specific features or acts described. Rather, the specific features and acts are disclosed as sample forms of implementing the claimed subject matter.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

For one or more aspects, at least one of the components set forth in one or more of the preceding figures may be configured to perform one or more operations, techniques, processes, or methods as set forth in the example section below. For example, the baseband circuitry as described above in connection with one or more of the preceding figures may be configured to operate in accordance with one or more of the examples set forth below. For another example, circuitry associated with a UE, base station, or network element as described above in connection with one or more of the preceding figures may be configured to operate in accordance with one or more of the examples set forth below in the example section.

Examples

In the following sections, further exemplary aspects are provided.

Example 1 includes a method of operating a UE, the method comprising: determining that the UE is configured with a number of packet filters for a plurality of protocol data unit (PDU) sessions; determining that UE includes insufficient resources to process the number of packet filters for the plurality of PDU sessions; generating a PDU session message based on determination that the UE includes insufficient resources; and transmitting the PDU session message to a network.

Example 2 includes the method of example 1 or some other example herein, wherein the PDU session message is a PDU session modification request.

Example 3 includes the method of example 2 or some other example herein, wherein the PDU session modification request includes a cause value set to indicate insufficient resources available for packet filtering.

Example 4 includes the method of example 2 or some other example herein, wherein the PDU session modification request is to indicate a maximum number of supported packet filters.

Example 5 includes the method of example 4 or some other example herein, wherein the maximum number is a first maximum number and the method further comprises: advertising, before generation and transmission of the PDU session modification request, a second maximum number of supported packet filters, the second maximum number being less than the first maximum number.

Example 6 includes the method of example 2 or some other example herein, wherein the PDU session modification request is to include a quality of service (QoS) information element (IE) to indicate one or more QoS rules the UE will continue to process.

Example 7 includes the method of example 1 or some other example herein, wherein the PDU session message is a PDU session release request and the method further comprises: identifying at least one PDU session of the plurality of PDU sessions based on relative priorities associated with the plurality of PDU sessions; and generating and transmitting the PDU session release request to release the at least one PDU session.

Example 8 includes a method comprising: storing prioritization information; establishing a plurality of protocol data unit (PDU) sessions; determining, based on the prioritization information, respective priorities for individual PDU sessions of the plurality of PDU sessions; determining a configuration order based on the respective priorities; and configuring packet filtering rules for at least some of the plurality of PDU sessions based on the configuration order.

Example 9 includes the method of example 8 or some other example herein, wherein the prioritization information is to prioritize PDU sessions based on a type of network slice or a type of network traffic.

Example 10 includes the method of example 9 or some other example herein, wherein the prioritization information is to prioritize PDU sessions based on a type of network slice and the method comprises determining respective priorities for individual PDU sessions based on single-network slice selection identifiers associated with the individual PDU sessions.

Example 11 includes the method of example 9 or some other example herein, wherein the prioritization information is to prioritize PDU sessions based on a type of network traffic, wherein voice and video types of network traffic are associated with a priority that is greater than other types of network traffic.

Example 12 includes the method of example 8 or some other example herein, further comprising: receiving one or more PDU session establishment accept messages from a network; and storing the prioritization information in the memory based on the one or more PDU session establishment accept messages.

Example 13 includes the method comprising: determining a maximum number of supported packet filters; determining a number of supported packet filters for a first protocol data unit (PDU) session based on the maximum number of supported packet filters and a number of supported PDU sessions, a number of active PDU sessions, or a previous configuration of packet filters for a second PDU session; and transmitting an indication of the number of supported packet filters for the first PDU session.

Example 14 includes the method of example 13 or some other example herein, wherein determining the number of supported packet filters for the first PDU session is based on the maximum number of supported packet filters divided equally among a number of supported PDU sessions.

Example 15 includes the method of example 13 or some other example herein, wherein determining the number of supported packet filters for the first PDU session is based on the maximum number of supported packet filters divided among a number of active PDU sessions.

Example 16 includes the method of example 15 or some other example herein, further comprising: transmitting a PDU session modification procedure to update a previous indication of a number of supported packet filters based on an update of the number of active PDU sessions.

Example 17 includes the method of example 13 or some other example herein, wherein determining the number of supported packet filters for the first PDU session is based on a previous configuration of packet filters for a second PDU session.

Example 18 includes the method of example 17 or some other example herein, wherein the first and second PDU sessions are of a first type and the method further comprises: determining that a network configured a first number of packet filters for the second PDU session; and determining that the number of supported packet filters for the first PDU session is the first number based on both the first and second PDU sessions being of the first type.

Example 19 includes a method of operating a UE, the method comprising: generating a message to include an indication of whether the UE supports one or more traffic descriptors that may be configured in a UE route selection policy (URSP) or access traffic steering, switching, and splitting (ATSSS) policy rules; and transmitting the message to a network.

Example 20 includes the method of example 19 or some other example herein, wherein the message is a non-access stratum registration request message.

Example 21 includes the method of example 19 or some other example herein, wherein the one or more traffic descriptors includes a domain-based traffic descriptor, application identifier (ID) based traffic descriptor, connection-capability based traffic descriptor, IP-based traffic descriptor, or non-IP-based traffic descriptor.

Example 22 includes the method of example 19 or some other example herein, wherein the indication is a first indication and the method further comprises transmitting a second indication to the network to indicate a number of ATSSS policy rules the UE can handle.

Example 23 includes the method of example 22 or some other example herein, further comprising generating the message to include the first and second indications.

Example 24 may include an apparatus comprising means to perform one or more elements of a method described in or related to any of examples 1-23, or any other method or process described herein.

Example 25 may include one or more non-transitory computer-readable media comprising instructions to cause an electronic device, upon execution of the instructions by one or more processors of the electronic device, to perform one or more elements of a method described in or related to any of examples 1-23, or any other method or process described herein.

Example 26 may include an apparatus comprising logic, modules, or circuitry to perform one or more elements of a method described in or related to any of examples 1-23, or any other method or process described herein.

Example 27 may include a method, technique, or process as described in or related to any of examples 1-23, or portions or parts thereof.

Example 28 may include an apparatus comprising: one or more processors and one or more computer-readable media comprising instructions that, when executed by the one or more processors, cause the one or more processors to perform the method, techniques, or process as described in or related to any of examples 1-23, or portions thereof.

Example 29 may include a signal as described in or related to any of examples 1-23, or portions or parts thereof.

Example 30 may include a datagram, information element, packet, frame, segment, PDU, or message as described in or related to any of examples 1-23, or portions or parts thereof, or otherwise described in the present disclosure.

Example 31 may include a signal encoded with data as described in or related to any of examples 1-23, or portions or parts thereof, or otherwise described in the present disclosure.

Example 32 may include a signal encoded with a datagram, IE, packet, frame, segment, PDU, or message as described in or related to any of examples 1-23, or portions or parts thereof, or otherwise described in the present disclosure.

Example 33 may include an electromagnetic signal carrying computer-readable instructions, wherein execution of the computer-readable instructions by one or more processors is to cause the one or more processors to perform the method, techniques, or process as described in or related to any of examples 1-23, or portions thereof.

Example 34 may include a computer program comprising instructions, wherein execution of the program by a processing element is to cause the processing element to carry out the method, techniques, or process as described in or related to any of examples 1-23, or portions thereof.

Example 35 may include a signal in a wireless network as shown and described herein.

Example 36 may include a method of communicating in a wireless network as shown and described herein.

Example 37 may include a system for providing wireless communication as shown and described herein.

Example 38 may include a device for providing wireless communication as shown and described herein.

Any of the above-described examples may be combined with any other example (or combination of examples), unless explicitly stated otherwise. The foregoing description of one or more implementations provides illustration and description, but is not intended to be exhaustive or to limit the scope of aspects to the precise form disclosed. Modifications and variations are possible in light of the above teachings or may be acquired from practice of various aspects.

Although the aspects above have been described in considerable detail, numerous variations and modifications will become apparent to those skilled in the art once the above disclosure is fully appreciated. It is intended that the following claims be interpreted to embrace all such variations and modifications.

What is claimed is:

1. One or more non-transitory, computer-readable media (NTCRM) having instructions that, when executed, cause processor circuitry to:
   determine a maximum number of supported packet filters;
   determine a number of supported packet filters for a first protocol data unit (PDU) session based on the maximum number of supported packet filters and a number of supported PDU sessions, a number of active PDU sessions, or a previous configuration of packet filters for a second PDU session; and
   generate a message with an indication of the number of supported packet filters for the first PDU session.

2. The one or more NTCRM of claim 1, wherein determining the number of supported packet filters for the first PDU session is based on the maximum number of supported packet filters divided equally among a number of supported PDU sessions.

3. The one or more NTCRM of claim 1, wherein the message is transmitted and the instructions, when executed, further cause the processor circuitry to:
   determine an update of a number of active PDU sessions; and
   after the message is transmitted, generate a PDU session modification request to update the indication of the number of supported packet filters based on the update of the number of active PDU sessions.

4. The one or more NTCRM of claim 1, wherein the instructions, when executed, further cause the processor circuitry to:
   determine the number of supported packet filters for the first PDU session based on a previous configuration of packet filters for a second PDU session.

5. The one or more NTCRM of claim 4, wherein the first and second PDU sessions are of a first type and the instructions, when executed, further cause the processor circuitry to:
   determine that a network configured a first number of packet filters for the second PDU session.

6. The one or more NTCRM of claim 5, wherein the instructions, when executed, further cause the processor circuitry to:
   determine that the number of supported packet filters for the first PDU session is the first number based on both the first and second PDU sessions being of the first type.

7. A method comprising:
   determining a maximum number of supported packet filters;
   determining a number of supported packet filters for a first protocol data unit (PDU) session based on the maximum number of supported packet filters and a number of supported PDU sessions, a number of active PDU sessions, or a previous configuration of packet filters for a second PDU session; and generating a message with an indication of the number of supported packet filters for the first PDU session.

8. The method of claim 7, wherein determining the number of supported packet filters for the first PDU session is based on the maximum number of supported packet filters divided equally among a number of supported PDU sessions.

9. The method of claim 7, wherein the message is transmitted and the method further comprises:
determining an update of a number of active PDU sessions; and
after the message is transmitted, generating a PDU session modification request to update the indication of the number of supported packet filters based on the update of the number of active PDU sessions.

10. The method of claim 7, further comprising:
determining the number of supported packet filters for the first PDU session based on a previous configuration of packet filters for a second PDU session.

11. The method of claim 10, wherein the first and second PDU sessions are of a first type and the method further comprises:
determining that a network configured a first number of packet filters for the second PDU session.

12. The method of claim 11, further comprising:
determining that the number of supported packet filters for the first PDU session is the first number based on both the first and second PDU sessions being of the first type.

13. An apparatus comprising:
processing circuitry to:
determine a number of supported packet filters for a first protocol data unit (PDU) session, wherein the number of supported packet filters for the first PDU session is based on a maximum number of supported packet filters and a number of supported PDU sessions, a number of active PDU sessions, or a previous configuration of packet filters for a second PDU session; and
generate configuration information to configure a user equipment (UE) with one or more packet filters, wherein the one or more packet filters is equal to or less than the number of supported packet filters; and
interface circuitry coupled with the processing circuitry to enable communication.

14. The apparatus of claim 13, wherein the processing circuitry is to:
determine the number of supported packet filters for the first PDU session based on a message received from the UE, wherein the number of supported packet filters for the first PDU session is based on the maximum number of supported packet filters divided equally among a number of supported PDU sessions.

15. The apparatus of claim 13, wherein the processing circuitry is to:
determine the number of supported packet filters based on a number of active PDU sessions.

16. The apparatus of claim 13, wherein the processing circuitry is to:
determine the number of supported packet filters for the first PDU session based on a message received from the UE, wherein the number of supported packet filters for the first PDU session is based on a previous configuration of packet filters for a second PDU session.

17. The apparatus of claim 16, wherein the first and second PDU sessions are of a first type and the processing circuitry is further to:
configure a first number of packet filters for the second PDU session.

18. The apparatus of claim 17, wherein the number of supported packet filters for the first PDU session is determined to be the first number based on both the first and second PDU sessions being of the first type.

* * * * *